May 5, 1953 F. G. LESNIAK ET AL 2,637,120
APPARATUS AND PROCESS FOR BAKING SHEET MATERIAL
Filed April 23, 1948 3 Sheets-Sheet 1

INVENTOR
FRANK G. LESNIAK
LESLIE G. JANETT
BY
*Harry A. Mitman*
ATTORNEY

May 5, 1953 F. G. LESNIAK ET AL 2,637,120
APPARATUS AND PROCESS FOR BAKING SHEET MATERIAL
Filed April 23, 1948 3 Sheets-Sheet 2

INVENTOR
FRANK G. LESNIAK
LESLIE G. JANETT
BY Harry A. Mitman
ATTORNEY

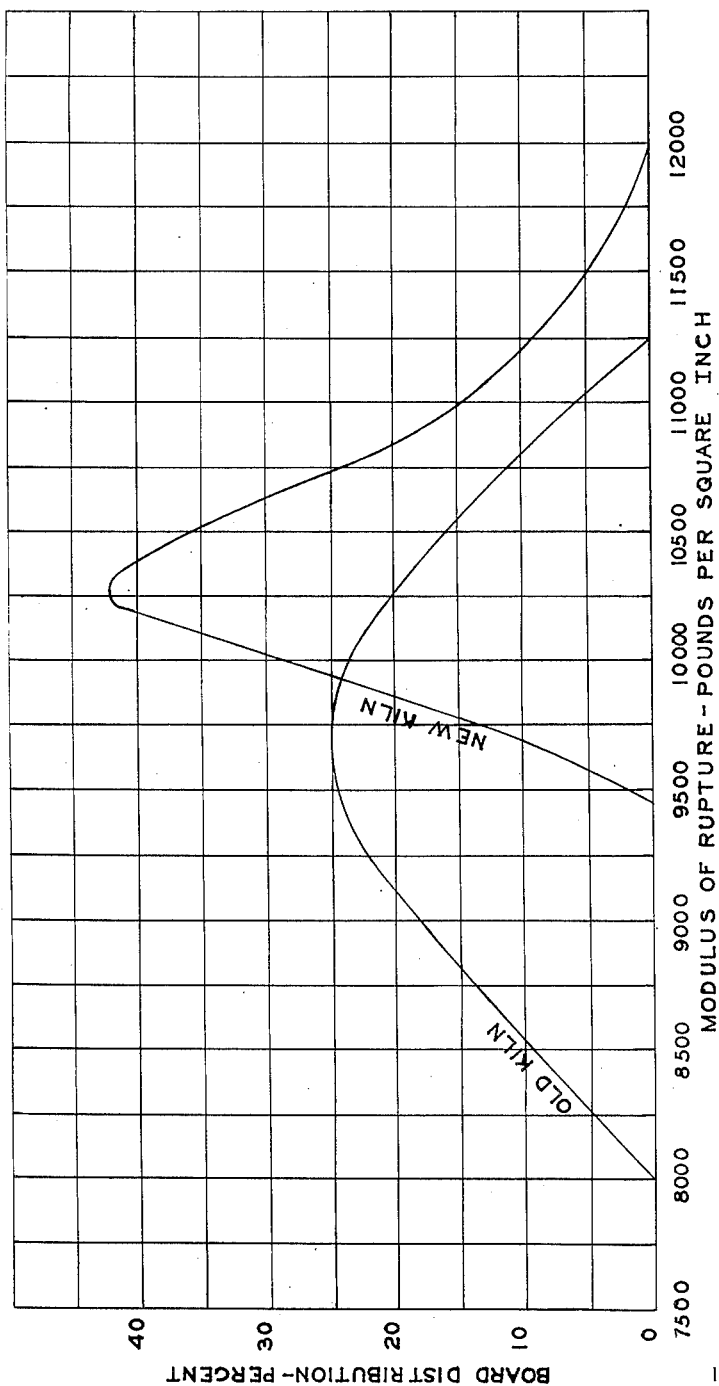

Patented May 5, 1953

2,637,120

UNITED STATES PATENT OFFICE 2,637,120

APPARATUS AND PROCESS FOR BAKING SHEET MATERIAL

Frank G. Lesniak, Laurel, Miss., and Leslie G. Janett, Chicago, Ill., assignors to Masonite Corporation, Laurel, Miss., a corporation of Delaware Application April 23, 1948, Serial No. 22,928

9 Claims. (Cl. 34—24)

This invention relates to a method and apparatus for heat treating fibrous sheet materials or boards and more particularly to a method and apparatus for more uniformly and more rapidly baking impregnated fibrous boards.

Heretofore sheet materials of this type were baked in a kiln somewhat similar to the kiln of the present invention, the chief difference being in the heat supplying means and method of distributing the heat. The heat supplying means of the prior art kiln comprised several banks of pipes, each bank including a series of parallel pipes through which steam was passed, lying beneath the boards and positioned parallel to the flat surfaces and at right angles to the vertical axes of the boards. Fans were installed in an attempt to circulate the heat and increase the efficiency of the kiln, however it was found that the fans made no substantial difference. Thus the kiln was heated with the heat given off in a natural manner by the steam heating pipes. This kiln had one baffle corresponding to baffle 11 (mentioned hereinafter) of the kiln of the present invention. This type kiln used prior to the present invention is referred to herein as the conventional, prior art or old kiln.

While the present invention will be described in particular with reference to impregnated lignocellulose fiber hardboards, e. g. as disclosed in U. S. Patent 1,941,536 issued to Robert M. Boehm, January 2, 1934, because this is the field in which it has a large application and in which it has been most extensively evaluated, nevertheless it is applicable to fibrous sheet materials in general where there is the need for uniform heat treatment or baking, e. g. as disclosed in U. S. Patent 2,220,047 to William H. Mason. Although the physical properties, e. g. strength of impregnated materials after baking will depend somewhat on the impregnant used, the advantages of this invention are still realized.

An object of this invention is to provide a method and apparatus for heat treating fibrous boards. A further object is to provide a method and apparatus for baking impregnated lignocellulose fiber hardboards. A still further object is to provide such a method and apparatus characterized by producing a marked increase in uniformity of baking, higher baked strength and a tremendous reduction in baking time. Other objects will appear from the description of this invention given hereinafter.

The above objects are accomplished according to this invention for example by baking lignocellulose fiber hardboards in a kiln charged with the boards such that their flat surfaces are exposed and uniformly spaced apart, passing heated air under pressure uniformly into the kiln through a tapered duct extending beneath the boards and having a multiplicity of parallel elongated openings or slots positioned at right angles to the flat surfaces and to the longitudinal edges of the boards, directing the air uniformly over the flat surfaces of the boards by means of baffles located between the duct and boards such that flat surfaces of the baffles are parallel to the flat surfaces of the boards and extend along the boundaries of the base of the charge of boards, then withdrawing the air uniformly from the kiln with suction means and additional baffles.

As a matter of convenience herein, the strength of the sheet refers to the modulus of rupture (abbreviated M. O. R.) in transverse bending given in pounds per square inch.

This invention will be more fully illustrated by referring to the accompanying drawings wherein identical reference numerals are used to indicate similar parts in the figures.

Referring to the drawings:

Figure 4 is a graph showing the modulus of rupture distribution curve of boards baked in the new kiln versus that of boards baked in an old kiln.

Figure 1:
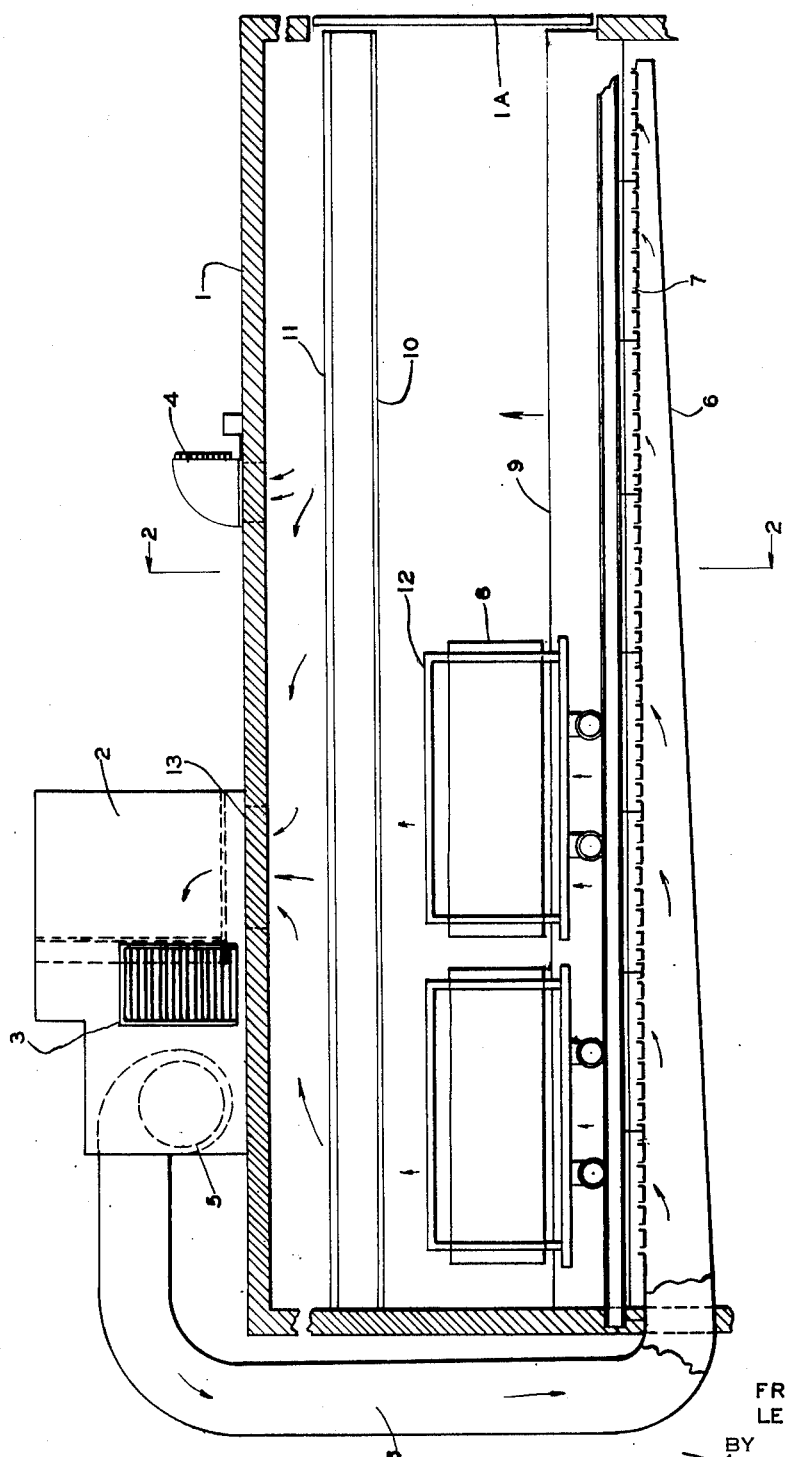
Figure 1 is a side elevation showing in general the outlay of the kiln and the air circulation path.
Figure 3:
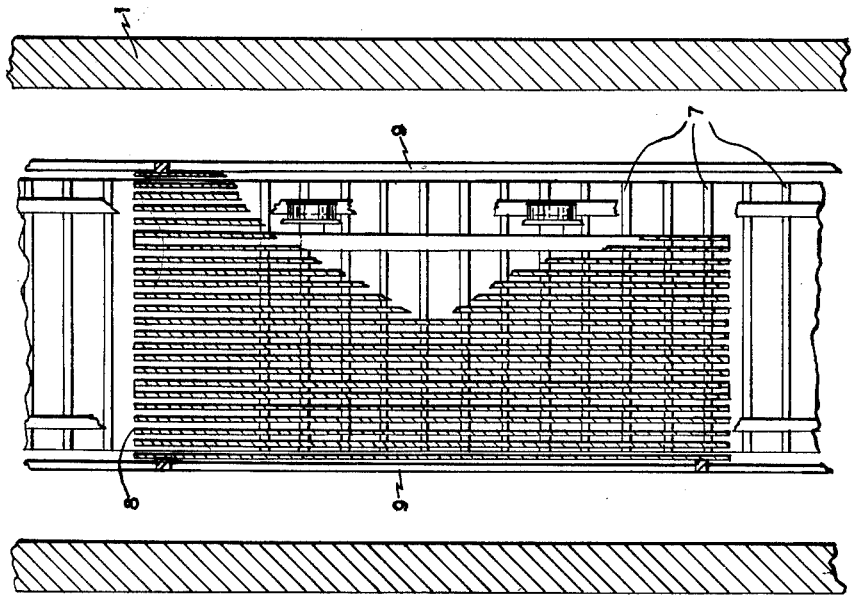
Figure 3 is a broken-out horizontal section on line 3—3 of Figure 2 showing the relationship between the elongated openings or slots and the boards.
Figure 2:
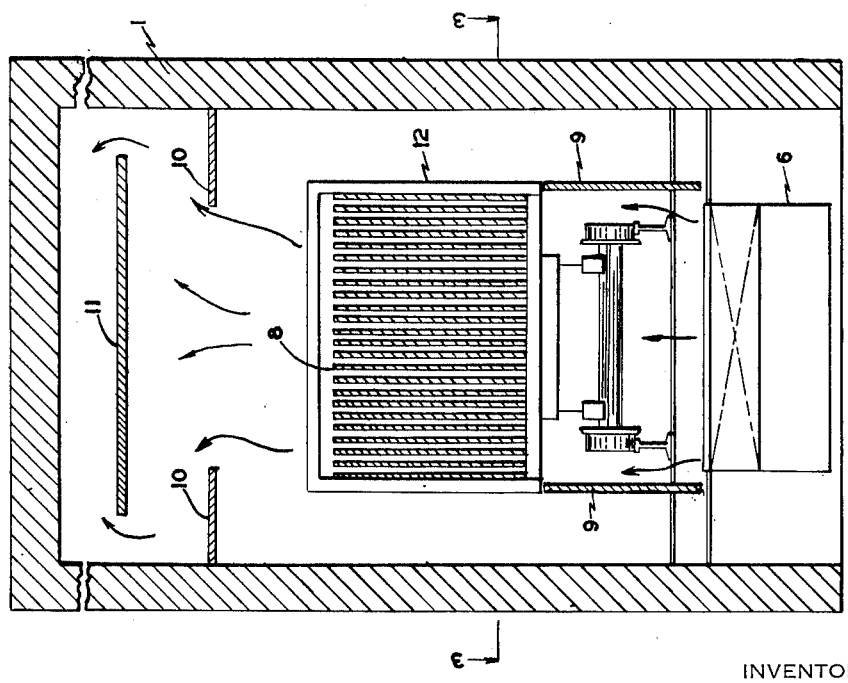
Figure 2 is an end view on line 2—2 of Figure 1 showing the relationship between the charge and air circulation system.

Referring now to the drawings in greater detail, the apparatus according to a preferred embodiment of this invention comprises a kiln 1, provided with doors 1a; a heating chamber 2 banked with heating elements (not shown) and having an inlet damper 3; a discharger damper 4; a fan 5 for circulating the heated air; a duct 6 for conveying the air, tapered as shown so as to maintain an equal pressure therein; equally spaced parallel elongated openings or slots 7 in the top of the duct for supplying air uniformly into the kiln, said slots being positioned at right angles to the flat surfaces and to the longitudinal edges of the boards 8 for discharging the air uniformly over the flat surfaces of the boards; a pair of lower baffles 9 for directing the air uniformly through between the boards, a pair of upper baffles 10 and a single upper baffle 11 and fan 5 for withdrawing the air uniformly from the kiln to be reheated and recirculated.

Through use of the circulating fan frequent air changes are obtained in the kiln.

The arrangement and construction of the baffles 9, 10 and 11 is important. The two lower baffles 9 are located between the duct 6 and the boards 8 and extend along the boundaries of the base of the charge of boards with the flat surfaces of the baffles substantially parallel to the flat surfaces of the boards. Since the baffles 9 are so positioned, practically all of the air flowing from the duct openings 7 will be directed between the boards 8. The upper baffles 10 are positioned above the boards 8, and extend along and from the side walls of the kiln with the flat surfaces of the baffles 10 being substantially perpendicular to the walls of the kiln. The single baffle 11 is positioned above baffles 10 and substantially parallel thereto and with the longitudinal edges of the baffle 11 spaced from the side walls of the kiln.

In constructing the baffle arrangement within the kiln, it has been found that consistently good results are obtained when the total area of the two upper baffles 10 is calculated so that the opening between the baffles 10 will be less than the opening between baffles 9. Similarly, the area of baffle plate 11 is calculated so that the total area of the openings between the edges of baffle 11 and the side walls of the kiln will be less than the opening between baffles 10.

Preferably the kiln is equipped with conventional means (not shown) for automatically controlling and recording the temperature therein. As a safety precaution against possible fires desirably the kiln is equipped with a conventional automatic sprinkler system (not shown).

In practicing this invention according to a preferred embodiment thereof, the kiln 1 is charged with boards 8 placed on edge in racks 12. The kiln is closed and the heat-supplying mechanism is started. (Arrows in the figures indicate the general direction of the air flow). The fan 5 forces heated air under pressure through the duct 6. The tapered duct enables a substantially uniform pressure to be maintained throughout its entire length and uniform flow of air therethrough which in turn insures uniform supply of heated air to the slots 7 opening into the kiln. The air is passed through and diffused by the elongated openings or slots 7 which, in combination with the baffles 9, direct the air uniformly over the flat surfaces of the boards 8. This arrangement also creates a positive pressure head beneath the boards and forces practically all the air passing through the kiln to pass through between the boards, thereby more efficiently utilizing the air for baking the boards. After the air has passed uniformly through between the boards the major portion of it impinges against the pair of upper baffles 10 and the single upper baffle 11 thereby creating a back pressure. These baffles 10 and 11 in conjunction with the fan suction means 5 enable uniform withdrawal of the air from the kiln through opening 13 into the heating chamber 2 to be reheated and recirculated.

During operation of the kiln some of the heated circulating air is vented off to the atmosphere through discharge damper 4, and simultaneously fresh air is added to the circulating air in the kiln through inlet damper 3 to replace the air exhausted through damper 4. In this manner the supply of oxygen can be maintained at satisfactory levels to obtain suitable baking conditions for the oil impregnating materials in the boards. It is desirable to have frequent air circulation cycles in the kiln, preferably about 4 to 8 times per minute although more frequent changes may be used.

As compared with conventional baking methods, the overall accomplishment of this invention is to increase remarkably uniformity of strength of the boards and to increase slightly the average strength thereof, as measured e. g. by modulus of rupture, and to reduce the baking cycle about 50% or more.

While the above advancement made in the art by this invention may be attributed to a combination of elements, for instance the heating and circulating arrangement of air, the tapered duct 6, the arrangement of the elongated openings or slots 7 and the baffles 9, 10 and 11, outstanding and essential features of the combination are the baffle arrangements and the elongated openings or slots positioned at right angles to the flat surfaces and to the longitudinal edges of the boards.

The following example illustrates the improved results obtained by baking boards according to the present invention (new kiln) as compared with the results obtained by baking boards according to conventional practice (old kiln). In each case substantially identical ⅛ inch hardboards of hydrolyzed lignocellulose fibrous material were impregnated with the same impregnant and divided into two lots. The two lots of hardboard were baked; one lot was baked according to the present invention (new kiln), whereas the other lot was baked according to conventional practice (old kiln) as described in the second paragraph of this application. Both lots were baked at substantially the same temperature, that is at about 300° F., bearing in mind that the temperature of the old kiln was more difficult to control than that of the new kiln. The data represent numerous tests. Part I of the example is a comparison between an old type kiln and a kiln according to the instant invention showing the percent of boards which fell in the specified 500 increment ranges of M. O. R. Part II of the example summarizes the percent of boards in Part I which fell below the minimum specification of 9000 M. O. R. and gives the additional items of board uniformity, average M. O. R. and the baking cycle of the old and new kilns.

EXAMPLE

Part I

| M. O. R. Range | Old Kiln, percent within Range | New Kiln, percent within Range |
| --- | --- | --- |
| 7,500–7,999 | Zero | Zero |
| 8,000–8,499 | 8.33 | Zero |
| 8,500–8,999 | 22.22 | Zero |
| 9,000–9,499 | 11.11 | 2.77 |
| 9,500–9,999 | 19.50 | 16.66 |
| 10,000–10,499 | 27.77 | 41.66 |
| 10,500–10,999 | 11.11 | 27.77 |
| 11,000–11,499 | Zero | 8.33 |
| 11,500–11,999 | Zero | 2.77 |
| 12,000–12,499 | Zero | Zero |

Part II

| | Old Kiln | New Kiln |
| --- | --- | --- |
| Rejects (percent below 9,000 M. O. R. min. specification) | 30.55 | Zero |
| Average M. O. R. | 9,535 | 10,380 |
| Board Uniformity (Max. percent M. O. R. variation of a typical board from avg. M. O. R. thereof) | +14.83 / −11.34 | +6.48 / −5.25 |
| Baking Cycle (Hours) | 7¼ | 3 |

The gist of Part I of the example is that in the new kiln 42% of the boards fell in the 10,000–10,499 M. O. R. range, whereas in the old kiln only 28% fell in this range (these percentages being the peak or the largest percent falling in any one range in the respective kilns); in the new kiln 42% of the boards fell in the same M. O. R. range as the average M. O. R. (10,380) of the kiln, whereas in the old kiln only 20% fell in the same range as the kiln average (9,535); in the new kiln 77% of the boards fell in the M. O. R. ranges consisting of the peak range (10,000–10,499) and the closest range on either side thereof, whereas in the old kiln only 58% of the boards fell in its comparable ranges; in the new kiln the percent of boards falling in the various consecutive M. O. R. ranges progresses gradually to a peak and then tapers off gradually, whereas in the old kiln these figures are very erratic; in the new kiln none of the boards fell below the 9000 M. O. R. minimum specification, whereas in the old kiln 31% fell below and had to be rejected and rebaked.

In addition to showing summarily the percent of rejects, Part II shows that the board strength uniformity (expressed in M. O. R.) in the new kiln was remarkably higher than in the old kiln, that the time of the baking cycle in the new kiln was reduced more than 50%, and that the average M. O. R. of the new kiln was somewhat higher than that of the old kiln.

The data of Part I of the example are used to plot the distribution or frequency curves in Figure 4. These curves compare the normal pattern of the baking cycle of the new kiln with that of the old kiln. The M. O. R. of the new kiln baking cycle comes within a narrow spread, within the higher ranges and reaches a higher peak.

The data given hereinbefore show rather convincingly the major contributions this invention has made to the art, namely (1) greatly increased board uniformity, (2) increased baking uniformity throughout the kiln, (3) rejects or boards having to be rebaked reduced from 31% in the old kiln to zero in the new kiln, (4) more than 50% reduction of time in the baking cycle, and (5) higher baked strength.

As many apparently widely different embodiments of this invention may be made without departing from the spirit and scope thereof, it is to be understood that the invention is not to be limited to the specific embodiments thereof except as defined in the appended claims.

We claim:

1. Method of baking impregnated lignocellulose fibrous hardboards which comprises charging a kiln with said boards such that the flat surfaces thereof are exposed and uniformly spaced apart, passing heated air under pressure uniformly into the kiln through parallel elongated openings positioned at right angles to the flat surfaces and to the longitudinal edges of the boards and through an area within the kiln below the boards substantially equal to the area defined by the length and width of the charge of boards, passing the air uniformly over the flat surfaces of the boards, passing the air uniformly within the kiln above the boards through an abruptly restricted area substantially equal to the width of the charge into an unrestricted area and then through a second and more abruptly restricted area into a second unrestricted area, and finally withdrawing the air from the kiln to be reheated and recirculated, thereby obtaining baked boards of substantially uniform and high physical properties.

2. Method of baking impregnated lignocellulose fibrous boards as defined in claim 1, and in which the temperature of the heated air is maintained at about 300° F.

3. Apparatus for heat treating to substantially uniform and to high physical properties fibrous sheet materials or boards charged into a kiln such that the flat surfaces thereof are exposed and uniformly spaced apart which comprises walls forming a kiln, means comprising a flat tapered duct in the base of the kiln and having elongated parallel openings extending across said duct for passing heated air under pressure uniformly into the kiln, means supporting the boards or sheets on one edge at right angles to the openings, means for directing the air uniformly through between the boards, means for withdrawing the air from the kiln to be reheated and recirculated.

4. Apparatus for heat treating to substantially uniform and to high physical properties fibrous sheet materials or boards charged into a kiln such that the flat surfaces thereof are exposed and uniformly spaced apart which comprises walls forming a kiln, means comprising a flat tapered duct in the base of the kiln and having elongated parallel openings extending across said duct for passing heated air under pressure uniformly into the kiln, means supporting the boards or sheets on one edge at right angles to the openings, baffles for directing the air uniformly through between the boards, additional baffles to restrict flow of air and suction means for withdrawing the air from the kiln to be reheated and recirculated.

5. Apparatus for baking substantially uniformly and to high physical properties impregnated lignocellulose fiber hardboards charged into a kiln such that the flat surfaces thereof are exposed and uniformly spaced apart which comprises, walls forming a kiln, means comprising a flat tapered duct in the base of the kiln and having a multiplicity of elongated parallel openings extending across said duct for passing heated air under pressure uniformly into the kiln, means supporting the boards on one edge at right angles to and above the openings, baffles for directing the air uniformly through between the boards, additional baffles to restrict flow of air and suction means for withdrawing the air from the kiln to be reheated and recirculated.

6. Apparatus for baking substantially uniformly and to high physical properties impregnated lignocellulose fiber hardboards charged into a kiln such that the flat surfaces thereof are exposed and uniformly spaced apart which comprises, walls forming a kiln, means comprising a flat tapered duct in the base of the kiln and having a multiplicity of elongated parallel openings extending across said duct for passing heated air under pressure uniformly into the kiln, means supporting the boards on one edge at right angles to and above the openings, baffles positioned between the duct and boards such that the flat surfaces of the baffles are parallel to the flat surfaces of the boards and extend along the boundaries of the base of the charge of boards for directing the air uniformly through between the boards, additional baffles including a pair of baffles in the same plane extending along and from the sides of the kiln above the boards and having their flat surfaces perpendicular to the flat surfaces of the boards and also a single baffle above said pair of baffles spaced from the sides of the kiln and being in the same relative position to the boards, and suction means for withdrawing the air from the kiln to be reheated and recirculated.

7. Apparatus for baking lignocellulose fiber hardboards charged into a kiln such that the flat surfaces thereof are exposed and uniformly spaced apart which comprises, walls forming a kiln, means comprising a flat tapered duct in the base of the kiln and having a multiplicity of elongated parallel openings extending across said duct for passing heated air under pressure uniformly into the kiln, means supporting the boards on one edge at right angles to and above the openings, a pair of baffles positioned between the duct and boards such that the flat surfaces of the baffles are parallel to the flat surfaces of the boards and extend along the longitudinal boundaries of the base of the charge of boards, a second pair of baffles extending along and from the side walls of the kiln above the boards and having their flat surfaces perpendicular to the flat surfaces of the boards and the total area of the flat surfaces of said second pair of baffles being such that the opening between the innermost points of the baffles is less than the opening between said first pair of baffles, a third baffle above said second pair of baffles spaced from the side walls of the kiln and the area of the baffle being such that the total opening between the baffle edges and the side walls of the kiln is less than the opening between the edges of said second pair of baffles, and suction means for withdrawing the air from the kiln to be reheated and recirculated.

8. Method of heat treating impregnated lignocellulose fibrous hardboards in the presence of oxygen-containing gas to polymerize the impregnant in situ which comprises charging a kiln with said boards aligned on edge to present their flat surfaces in exposed and uniformly spaced relationship, passing heated air under pressure uniformly into the kiln through parallel elongated openings positioned at right angles to the flat surfaces and to the longitudinal edges of the boards and through an area within the kiln below the boards substantially equal to the area defined by the length and width of the charge of boards, passing the air uniformly over the flat surfaces of the boards, passing the air uniformly within the kiln above the boards through an abruptly restricted area substantially equal to the width of the charge into an unrestricted area and then through a second and more abruptly restricted area into a second unrestricted area, withdrawing a portion of the air from the kiln and enriching it with additional fresh air, and reheating and recirculating the gaseous mixture, thereby obtaining heat treated boards in which the impregnant has been uniformly polymerized throughout the boards.

9. Method of heat treating impregnated lignocellulose fibrous boards as defined in claim 8, and in which the temperature of the heated air is maintained at about 300° F.

FRANK G. LESNIAK.
LESLIE G. JANETT.

References Cited in the file of this patent

UNITED STATES PATENTS

| Number | Name | Date |
|---|---|---|
| 1,014,190 | Wenborne | Jan. 9, 1912 |
| 1,539,817 | Thelen | May 26, 1925 |
| 1,745,375 | Mueller | Feb. 4, 1930 |
| 1,750,794 | Cutler | Mar. 14, 1930 |
| 1,778,586 | Cobb | Oct. 14, 1930 |
| 1,900,846 | Russell et al. | Mar. 7, 1933 |
| 1,941,536 | Boehm | Jan. 2, 1934 |
| 1,942,828 | Parkes | Jan. 9, 1934 |
| 2,120,205 | Meyercord | June 7, 1938 |
| 2,168,478 | Hyde et al. | Aug. 8, 1939 |
| 2,220,047 | Mason | Oct. 29, 1940 |